(12) United States Patent
Amorim

(10) Patent No.: US 9,405,914 B2
(45) Date of Patent: Aug. 2, 2016

(54) DATA ANALYSIS SYSTEM

(75) Inventor: Aaron Amorim, Toronto (CA)

(73) Assignee: Thales Canada Inc., Toronto, ON (CA)

( * ) Notice: Subject to any disclaimer, the term of this patent is extended or adjusted under 35 U.S.C. 154(b) by 465 days.

(21) Appl. No.: 13/104,196

(22) Filed: May 10, 2011

(65) Prior Publication Data

US 2012/0290576 A1 Nov. 15, 2012

(51) Int. Cl.
*G06F 7/00* (2006.01)
*G06F 17/00* (2006.01)
*G06F 21/57* (2013.01)
*G06F 17/30* (2006.01)

(52) U.S. Cl.
CPC ........ *G06F 21/577* (2013.01); *G06F 17/30563* (2013.01); *G06F 17/30569* (2013.01)

(58) Field of Classification Search
CPC .................. G06F 17/30342; G06F 17/30563; G06F 17/30569
USPC .......... 707/600, 687, 690, 694, 702; 714/100, 714/1, 25, 37, 47.1, 48
See application file for complete search history.

(56) References Cited

U.S. PATENT DOCUMENTS

| | | | |
|---|---|---|---|
| 5,586,025 A * | 12/1996 | Tsuji et al. ..................... | 715/207 |
| 5,764,155 A * | 6/1998 | Kertesz et al. ................ | 700/295 |
| 5,978,717 A | 11/1999 | Ebersöhn et al. | |
| 6,343,236 B1 | 1/2002 | Gibson et al. | |
| 6,609,083 B2 * | 8/2003 | Enck et al. .................... | 702/186 |
| 6,651,034 B1 | 11/2003 | Hedlund et al. | |
| 6,662,188 B1 | 12/2003 | Rasmussen et al. | |
| 7,107,273 B2 * | 9/2006 | Ohata et al. ................... | 707/103 |
| 7,609,650 B2 * | 10/2009 | Roskowski et al. ........... | 370/252 |
| 7,698,028 B1 | 4/2010 | Bilodeau et al. | |
| 7,809,667 B1 * | 10/2010 | Yehuda et al. .................. | 706/47 |
| 7,840,296 B2 * | 11/2010 | Sanford et al. ................ | 700/108 |
| 2002/0143753 A1 | 10/2002 | Kawase | |
| 2002/0198858 A1 | 12/2002 | Stanley et al. | |
| 2005/0187973 A1 * | 8/2005 | Brychell et al. ........... | 707/104.1 |
| 2007/0130180 A1 | 6/2007 | Rasmussen et al. | |
| 2007/0288500 A1 * | 12/2007 | Sarnowicz et al. ........... | 707/102 |
| 2008/0114873 A1 * | 5/2008 | Chakravarty et al. ......... | 709/224 |
| 2008/0243445 A1 | 10/2008 | Herman et al. | |
| 2010/0114529 A1 * | 5/2010 | May et al. ..................... | 702/183 |

(Continued)

FOREIGN PATENT DOCUMENTS

| | | |
|---|---|---|
| CN | 1845029 A | 10/2006 |
| CN | 101018150 A | 8/2007 |

(Continued)

OTHER PUBLICATIONS

Yong et al. Design of remote locomotive real-time monitoring system based on GPRS, 2009 IEEE. pp. 980-983.

(Continued)

*Primary Examiner* — Marc Somers
(74) *Attorney, Agent, or Firm* — Marks & Clerk

(57) ABSTRACT

A data analysis system for analyzing data from multiple devices has a database service module including a data storage subsystem storing data from collected from different devices. The data is stored in a meta-structure using primitives to classify the data. An analysis engine analyzes the data to determine whether the data defined by the meta-structure meets certain criteria in accordance with a stored set of rules. The system is useful, for example, in the detection of faults in railway infrastructure.

29 Claims, 6 Drawing Sheets

(56) References Cited

U.S. PATENT DOCUMENTS

2010/0185601 A1* 7/2010 Phibbs et al. .............. 707/718
2012/0159518 A1* 6/2012 Boliek et al. .............. 719/318

FOREIGN PATENT DOCUMENTS

| | | |
|---|---|---|
| CN | 101941446 A | 6/2012 |
| EP | 1552998 A2 | 7/2005 |
| JP | 2004306880 A | 11/2004 |
| JP | 2007137118 A | 6/2007 |
| JP | 2008005118 A | 1/2008 |
| JP | 2008-217612 A | 9/2008 |
| JP | 2009018770 A | 1/2009 |
| JP | 2001-306565 A | 11/2011 |
| KR | 2006075619 A | 7/2006 |
| WO | 2004/034204 A2 | 4/2004 |
| WO | 2009042283 A2 | 4/2009 |

OTHER PUBLICATIONS

Wikipedia: "Staging (Datenbank)", Oct. 8, 2010, retrieved from http://de.wikipedia.org/w/index.php?title=staging_(Datenbank)&oldid=80036063, retrieved on Jan. 26, 2015.

China Master's Thesis, Information Technology Series, Jian-hui Guo, Jun. 15, 2008, Electric Power Plant's Device Fault Diagnosis Based on RTDB, 14 pp.

* cited by examiner

DATA ANALYSIS SYSTEM

FIELD OF THE INVENTION

This invention relates to the field of data analysis, and more particularly to the analysis of data collected from multiple devices, which may be the same or disparate, such as is found in railway infrastructure.

BACKGROUND OF THE INVENTION

Railway infrastructure employs many diverse systems, each of which deploy many different device types each with their own diagnostic capabilities. These capabilities are rarely the same and their methods of providing data are even less likely to be the same. There is a need however to collect, compare, and correlate this data for testing, diagnostic and maintenance purposes. Currently harmonizing the data generated and the method in which it is provide is either impossible or impractical (zone controllers have different data sets due to different guideway layouts in each zone).

Current technologies such as independent data collection for each device type are too onerous as they would require some manual effort to centralize all data for cross comparison purposes. Furthermore, an existing solutions for network data collection, such as Simple Network Management Protocol (SNMP) is impractical because a) it imposes a protocol on these devices which may not be implementable, b) the SNMP protocol is based on event notification only and hence is inadequate as a data collection system, and c) it assumes that the devices generating data have a connection to a network and Network Management System (NMS) server which is not always the case.

Even SCADA (Supervisory Control and Data Acquisition) was deemed not to be a practical solution as the data sets that could be generated could potentially cause the overhead of the SCADA protocol to make the entire system unworkable. The current solutions deployed has networked devices (VOBCs, ZCs) report any faults to a central system (ATS). This is not sufficient as only those devices currently on the network are able transmit data leaving data from non-networked devices unaccounted for, and even those devices generate data that is desirable from a testing and diagnostics point of view. Furthermore, the reliability requirements of those networked devices tend to be at odds with diagnostic capabilities (the concepts of transparent voting and data smoothing to enhance reliability by definition destroy data that is required for predictive diagnostic capabilities).

SUMMARY OF THE INVENTION

According to the present invention there is provided a data analysis system for analyzing data from multiple devices, comprising a database service module including a data storage subsystem storing data from collected from different devices, and wherein the data is stored in a meta-structure using primitives to classify the data; and an analysis engine for analyzing the data to determine whether the data defined by the meta-structure meets certain criteria in accordance with a stored set of rules.

The basic idea of the invention is to design and develop an overlay system that abstracts how data is stored, collated and analyzed from the mechanism and manner in which the data is exported from the target devices. This allows the creation of a generalized data structure that is used at all levels of the collection, storage and analysis system except the layer that physically connects to the target device. The way this differentiates from existing solutions is that it imposes no requirements whatsoever on the target devices and allows the user to treat all data from all devices in a common manner.

The method thus collects all diagnostic data in its "natural" form and brings it together in a manner that allows analysis and cross comparison of the data. It also provides a centralized, automated storage mechanism as all devices may spread over many kilometers of guideway. The method also operates in such a manner as to be able to satisfy all technical requirements without impacting the vital or operational aspects of the system.

Embodiments of the invention allow any device that is capable of generating diagnostic data to be included in the diagnostic system. As the solution operates as an overlay it imposes no requirements on any device type in terms of data generated or the mechanism by which it is retrieved. This ensures that COTS (Commercial Off-the-shelf) or any other component in which there is no way to influence the design may be incorporated in the diagnostic system. Similarly it removes arbitrary requirements from the components whose design can be influenced. All that is required in these cases is to define what data has diagnostic value without concern for the physical or logic mechanism by which the data is exported from the device. Conceivably, the invention can even be deployed as an overlay on a competitors' system as long as the types of data generated and the mechanism by which it is accessible are known.

The invention therefore extends to a computer-implemented diagnostic system, for example, for monitoring or controlling the operation of driverless trains or other guided vehicles. The invention may be implemented in hardware, software running on a suitable processor or a combination thereof.

As the invention make no assumptions about data rates nor imposes any minimum requirements it can also be deployed in any system and tailored to the constraints of the system (for example, the data collection rate can be tuned to allow operation in a system with very little available bandwidth). The invention will continue to work in these conditions though the value of the data collected may be lowered.

In another aspect the invention provides method of analyzing data from multiple devices, comprising collecting the data from different devices on an on-going basis; storing the collected data in a data storage subsystem of a database service module in a meta-structure that uses primitives to classify the data; and analyzing the data to determine whether the data defined by the meta-structure meets certain criteria in accordance with a stored set of rules.

BRIEF DESCRIPTION OF THE DRAWINGS

The invention will now be described in more detail, by way of example only, with reference to the accompanying drawings, in which:—

DETAILED DESCRIPTION OF AN EXEMPLARY EMBODIMENT

Figure 1:
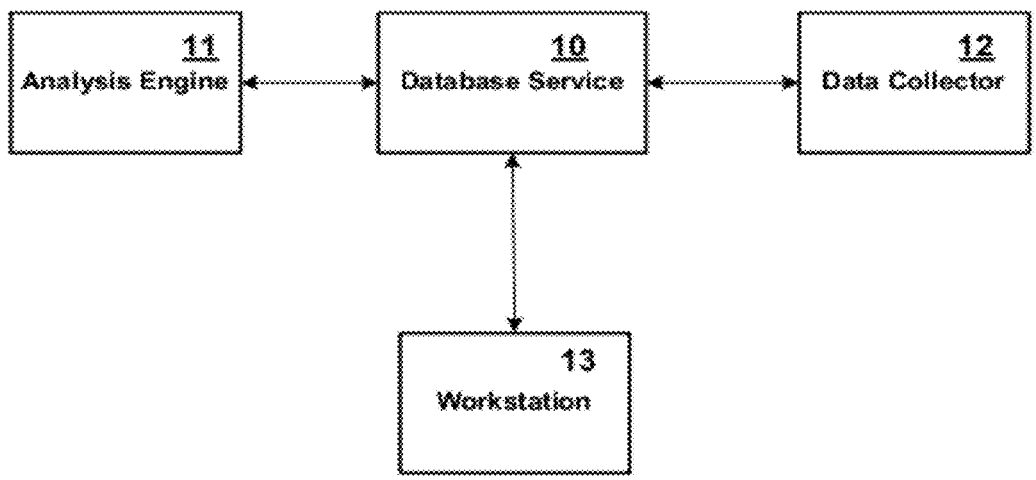
FIG. 1 is an overview of the data analysis system in accordance with one embodiment of the invention.

Referring to FIG. 1, the data analysis system will first be described at the top level of abstraction. The data analysis system comprises a Database Service module 10. This component acts as the central data repository and is responsible for the definition of the meta-structure applied to all data that allows that data to be handled in a common manner. Embodiments of the invention may have one or more Database Services and each Database Service will be active so that any other component may communicate with any deployed Database Service.

The Analysis Engine 11 is responsible for the correlation and comparison of data stored by the Database Service 10 and acts as the diagnostic component of the solution. This component defines the structure of rules that govern whether data is "good" or "bad" and what actions, if any, to take when "bad" data is detected. In this embodiment the rules are stored by the Database Service, although this is not a requirement. It is, however, considered good practice to implement rule storage in this manner as it provides a single repository for rule data as a deployment of the solution may have zero or more Analysis Engines.

The Data Collector 12 is responsible for collecting data from the target device(s) and translating that data into the meta-structure used by the Database Service. An embodiment of the invention one or more Data Collectors and each Data Collector may be responsible for collecting data from one or more devices or device types.

Workstation 13 is responsible for the user interface of the solution and allows a user to view data that has been collected as well as to allow the user to analyze that data. The Workstation is also capable of viewing, creating, modifying, or deleting rules. An embodiment of the invention may have zero or more Workstations.

Throughout the solution a meta-structure for all data is used. This structure allows disparate data to be homogenized so that it can be stored and used in a cohesive manner regardless of the form or source of the original data. This meta-structure uses the following primitives to classify data:

Device Type: A device type is a Data Collector defined classification for the source of a series of data. For example, a network switch or computer may each be device types. Device types are associated with the Data Collector that defined them.

Device Instance: Each device type may have one or more device instances. A device instance is simply an instance of a device type from which data is collected. For example, if a device type of "Network Switches" was defined, that device type may have device instance "Switch 1", "Switch 2", etc.

Data Type: A data type is a definition of a data point for a given device type. A device type may have multiple data types defined and then for each device instance of that device type, data corresponding to the defined data types for that device type would be collected from each of those device instances. The actual type of data for each data type is also defined when the data type is defined. For example, the data type "Active Status" for the device type "Network Switches" may be defined as an integer while the data type "Version" for the same device type may be defined as a character string. The invention imposes no limits on the type of data that a data type may take through in practice a series of types may be imposed. For example, for collecting data from the equipment deployed in a rail signaling installation it may be sufficient to limit the types of data types to integers, single point precision floating point numbers, or character strings with a maximum length of 100 characters. Other implementation factors such as the type of data storage solution may impose additional restrictions. For example, if a commercial (Structured Query Language) SQL database is used as the data storage mechanism the list of allowable data types may be limited by the primitives supported by that SQL database.

Figure 2:
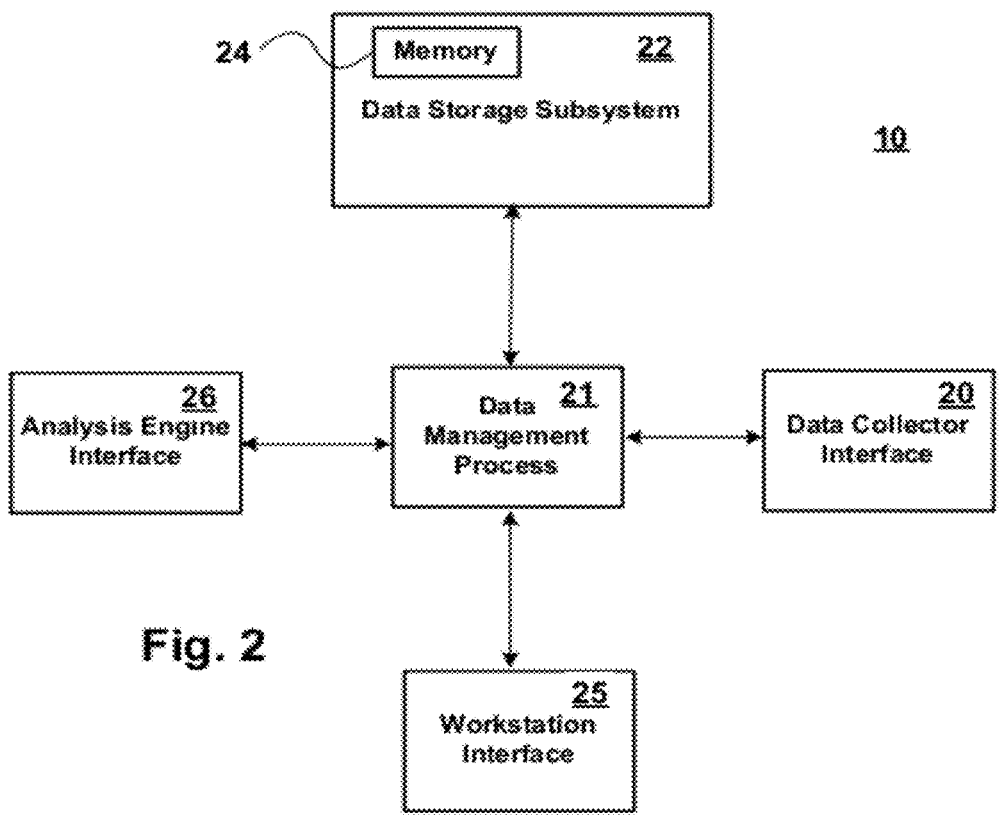
FIG. 2 is a block diagram of the database service module.

The Database Service 10 is shown in more detail in FIG. 2 and is responsible only for functions of reception of data received from the Data Collectors 12 and the storage and cataloging of that data based on the meta-structure defined above. Although exemplary mechanisms by which these functions are carried will be described, other mechanisms within the competence of persons skilled in the art may be used.

The database service 10 comprises the Data Collector Interface 20, which is responsible for communicating with the Data Collector(s) 12 providing the data to be stored. This data collector interface 20 is responsible for maintaining communication with Data Collector(s) 12 and receiving and processing data collected by them. This interface 20 is also responsible for allowing the Data Collector(s) 12 to define and manage the Device Types, Device Instances, and Data Types that those Data Collectors 12 are responsible for. The Data Collector Interface 20 is then responsible for passing all data received to the Data Management Process 21 where that data can then be stored in Data Storage subsystem 22 including memory 24.

Similarly, if the connected Data Collector 12 modifies the meta-structure for the data which it collects, these modifications are passed on to the Data Management Process 21 by the Data Collector Interface 20 so that the Data Management Process 21 may update, if necessary, the way it stores data in the Data Storage system 22.

The Data Collector Interface 20 is also responsible for receiving notification of on demand data collection from the Data Management Process 21. If such a notification is received, the Data Collector Interface 20 will relay this request to the Data Collector 12 for handling.

The Data Collector Interface 20 may preprocess the data received from a data collector 12 or simply pass the data on the Data Management Process 21. It is advantageous to simply pass the data on as this centralizes all data handling in the Data Management Process 21, which can aid in maintenance and development of the invention.

Similarly, the number of Data Collector Interfaces 20 that exist is implementation defined. The system can be built such that there is one Data Collector Interface 20 that is used by all Data Collectors 12 though the preferred implementation has a single Data Collector Interface 20 responsible for each Data Collector 12 that communicates with the Database Service 10.

The Workstation Interface 25 is responsible for communicating with the Workstation(s) 13 to provide data for use by the Workstation(s) as well as to provide the interfaces to retrieve and modifying rules. The Workstation Interface 25 is used by the Workstation(s) 13 to receive the status of what data is stored by the Database Service 10 as well as to download data for local usage. In addition, the Workstation Interface is also used by the Workstation(s) to retrieve the list of rules stored by the Database Service as well as to create new rules or delete or modify existing rules. The Workstation Interface 25 also allows Workstations 13 to store data in the event that the Workstation collected data directly from a Data Collector. If data is transmitted to the Workstation Interface 25 for storage, the Workstation Interface 25 will pass that data along to the Data Management Process 21 so that it can be handled just as if the data had been received by a Data Collector Interface 20.

Similarly to the Data Collector Interface 20, the Workstation Interface 25 acts as a gateway to the Data Management Process 21 and all implementation considerations applicable to the Data Collector Interface 20 also apply to the Workstation Interface 25.

The Analysis Engine Interface 26 is responsible for communication with the Analysis Engine(s) 11 to provide data and rules for use by the Analysis Engine(s) 11. The Analysis Engine Interface 26 simply provides to the connected Analysis Engine 11, via the Data Management Process 21, any data and rules requested by the Analysis Engine 11 for its own processing. The Analysis Engine Interface 26 can also provide a list of what data and rules are available if requested. The Analysis Engine Interface 26 is also responsible for receiving any requests for on demand data collection from the Analysis Engine(s) 11. If an on demand data collection request is received for a particular device type and device instance, the Analysis Engine Interface 26 is responsible for passing that notification onto the Data Management Process 21 so that it can be dispatched to the appropriate Data Collector Interface 20.

Similarly to the Data Collector Interface, the Analysis Engine Interface acts as a gateway to the Data Management Process and all implementation considerations applicable to the Data Collector Interface also apply to the Analysis Engine Interface.

The Data Management Process 21 is responsible for providing an abstraction of the Data Storage Subsystem 24 to the other components of the Database Service 10 and for managing the actual implementation of the Data Storage Subsystem 22. The Data Management Process 21 is responsible for structuring the Data Storage Subsystem 22 to allow for easy access and storage of data based on the meta-structure imposed by the invention. Whether this structuring is done physically or logically by the Data Storage Subsystem 22 or simply logically by the Data Management Process is a matter of design choice as long as to all users of the Data Management Process 21 all data is accessed and referenced via the meta-structure.

The same conditions apply to storage and accessing of rules. The rules exist and can determine whether or not data defined by the meta-structure is "good" or "bad". As a result the mechanism by which rules are stored and reference are a matter of choice although a good implementation will specify that the Data Management Process 21 is responsible for storing and providing access to the rules and that the rules are stored in the Data Storage Subsystem 22.

The Data Storage Subsystem 22 can be any sort of physical data storage and retrieval system that is abstracted by the Data Management Process 21. Examples of Data Storage systems may be anything from and SQL database to a simple flat data file or series of flat data files. The actually implementation of the Data Storage Subsystem 22 is outside the scope of the invention but the following should be considered when selecting a solution.

a) The Data Storage Subsystem 22 should ensure quick write times as it is conceivable that large amounts of data may be transmitted to the Database Service 10 for storage at a very fast rate. The write time should be greater than rate at which data is collected or some sort of cache and flush system should be used.

b) The Data Storage Subsystem 22 should allow for random access to data. Since multiple receivers of data (Workstation(s) and/or Analysis Engine(s)) may be requesting large amounts of different data simultaneously the Data Storage System should allow this to occur with minimal impact to system performance.

c) The Data Storage Subsystem 22 should provide some form of redundancy to ensure data integrity and system reliability in the case of failure.

d) The Data Storage Subsystem 22 should allow multiple simultaneous accesses. As a deployment may have more than one Database Service the Data Storage Subsystem 22 should allow all instances of the Database Service to access a single data repository. The Database Storage Subsystem should also implement mechanisms to ensure that multiple accesses does not destroy data integrity.

The implementation of the protocol(s) used for communication between the Database Service 10 and the Data Collector(s) 12, Workstation(s) 13, and Analysis Engine(s) 11 should satisfy the following:

a) The protocol should be connection oriented so that both the Database Service 10 and the other party can determine if the connection is lost even if data is not actively being transmitted. This should be done to allow failure handling and ensure data being transmitted is not lost on the false assumption that there was a receiver receiving the data.

b) A common protocol should be used for all interfaces. While not a requirement of the invention this eases development, debugging, and maintenance.

c) The protocol should have low overhead and be capable of transmitting and receiving confirmation of transmission at a rate greater than that at which data is being collected.

d) The protocol should transmit data in such a manner as to minimize the amount of translation that is required by Database Service 10 in parsing the received data. Since the Database Service 10 may conceivably be receiving and transmitting large amounts of data to and from multiple sources simultaneously it is advantageous to limit the amount of processing required by the Database Service 10 for each message.

Figure 3:
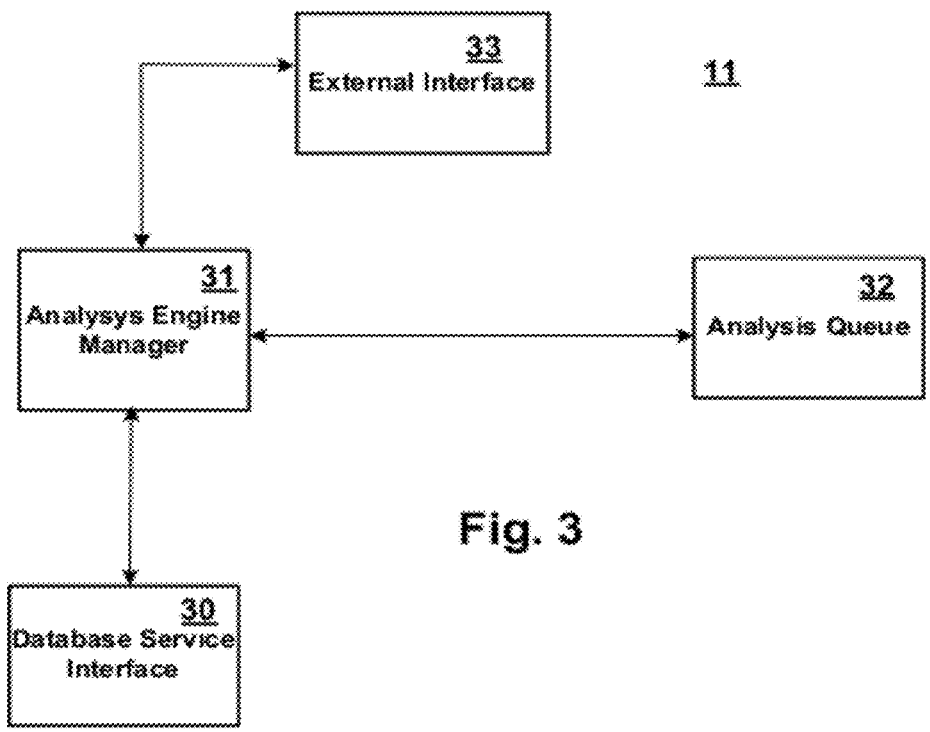
FIG. 3 is a block diagram of the analysis engine.

The Analysis Engine 11, shown in more detail in FIG. 3, is responsible for analyzing data stored by the Database Service 10 and determining whether that data is "good" or "bad". In the event of "bad" data being detected the Analysis Engine 11 is responsible for triggering a responsive action. The actual mechanisms of how data is analyzed, how a "good" or "bad" determination are made, and what actions if any are taken as a result of "bad" data are not in the scope of the invention.

The Database Service Interface 30 is responsible for communicating with the Database Service 10 through the Analysis Engine Interface 26 of the Database Service 10. As a result all the functionality and implementation considerations for this components are the same as for the Analysis Engine Interface 26 of the Database Service 10. From the Analysis Engine point of view, this component is responsible for abstracting the data source for the Analysis Engine so that all data stored on the Database Service 10 can be treated as if it existed locally. To the rest of the components of the Analysis Engine 11, the Database Service Interface 30 should appear to be the data itself. As embodiments of the invention may have multiple Database Service deployments, this component is responsible for determining which specific instance of the Database Service 10 to connect to and is also responsible for connecting to any other available Database Service 10 in the event that the current one become unavailable.

This database service interface 30 is also responsible for the "storage" of the rules that the Analysis Engine 11 used. As detailed above, the preferred implementation is for rules to be stored in the Database Service 10 in which case this component will simply abstract the interface to the Database Service 10 to retrieve the rules. In the event that the rules are stored locally with the Analysis Engine 11 then this component, as part of its responsibility to act as an abstraction of the data source, will also act as the storage location for the rules themselves. In this manner, regardless of the implementation chosen for the rules storage, to the rest of the components of the Analysis Engine 11 the interface to retrieve rule remains constant.

The Analysis Engine Manager 31 is responsible for coordinating the actions being taken by the current instance of the Analysis Engine 11. The Analysis Engine Manager 31 is responsible for determining what rules are to be run, in what order, and against which device types or device instance, as well as the frequency at which those rules are processed. The actual structure and capabilities of the rules are implementation defined, but such rules should exist, be executable, and be capable of determining if data is "good" or "bad".

The Analysis Engine Manager 31 allows for multiple "queues" of rules processing to exist and for each "queue" an Analysis Queue 32 will be created to process that "queue". For example, the Analysis Manager 31 can create an Analysis Queue 32 to process all rules for the device type "Network Switches" to be run once every 30 minutes and simultaneously have another Analysis Queue 32 running the rule "Emergency Brake Failure Detection" every 100 milliseconds.

No limits are imposed on the number of Analysis Queues 32 that may exist or of the capabilities of each at the top level (i.e. whether an Analysis Queue may only be assigned a "class" or rules, or if single rules may be assigned to an Analysis Queue, or if an Analysis Queue can be assigned all rules for a specific Device Instance or Device Type, etc.). The Analysis Engine Manager 31 should assign duties to Analysis Queues and that the Analysis Engine Manager can manage one or more Analysis Queues. The invention also allows, but does not require, that the number of Analysis Queues 32 and their allotted tasks may be dynamically assigned and changed.

The way the Analysis Engine Manager 31 assigns tasks to Analysis Queues is considered an implementation detail. For example, whether configuration files defining the number of Analysis Queues and their tasks are used or if user input is solicited through a graphical user interface the actual mechanism by which assignment are made to Analysis Queues is implementation defined.

The Analysis Queue 32 is responsible for processing the rules assigned to it by the Analysis Engine Manager 31. The Analysis Queue 32 is also responsible for taking action when "bad" data is detected. The actual action taken is considered implementation defined and should be defined by the rule but the system should allow for the following functionality:

a) The Analysis Queue 32 should notify the Analysis Manager of the failure and all available specifics so that it may be logged in the Database Service through the Database Service Interface.

b) Multiple levels of action may be defined. For example some failures may trigger a "warning" condition which will cause certain rules to be processed that otherwise would not normally be processed (in this manner normal processing of rules could occur at a higher level and then only in certain cases would specific data points be check to find out the exact cause of the problem) while other failures may trigger "alarms".

c) The Analysis Queue 32 can notify the Analysis Engine Manager to enable On Demand Data Collection. The Analysis Engine Manager would relay this notification to the Database Service through the Database Service Interface. In this manner the Analysis Queue could continue processing the suspect rule using more up to date data then may currently be available.

d) The Analysis Queue 32 can increase its assigned processing frequency temporarily. For example, if a boundary condition is detected the Analysis Queue could trigger On Demand Data Collection and the processes the suspect rule at a higher rate than assigned to see if an actual failure occurs with processing defaulting back to the assigned frequency once the boundary condition is no longer present or if a certain time limit expires. Note that expiration of the time limit may itself be interpreted as a failure with its own defined action.

e) The Analysis Queue 32 may generate an alarm to an external interface through the External Interface(s). For example, in a railway signaling system the Analysis Queue may trigger an alarm to the central control centre when a failure is detected or an email may be generated to maintenance personnel.

The External Interface(s) 33 are implementation defined. They permit communication with external systems by the Analysis Engine Manager 31 and the Analysis Queues 32. The mechanism of communication and its exact purpose are implementation defined but examples include relaying an alarm to an external system, generating messages to trigger maintenance actions, retrieving additional information (while this use is possible it is discouraged since any data that has diagnostic value should be collected by a Data Collector and not directly by the Analysis Engine), notification to an external system the all components of the Solution are functioning ("heartbeat" messages), and coordination between multiple instances of Analysis Engines 11.

As detailed above a deployment of the Solution may have multiple instances of the Analysis Engine 11 deployed and the solution allows each instance to work independently. It may be advantageous in certain implementation to have all instances of the Analysis Engine 11 coordinate their efforts and hence the invention permits this but treats it as an External Interface since the invention does not require this functionality.

Figure 4:
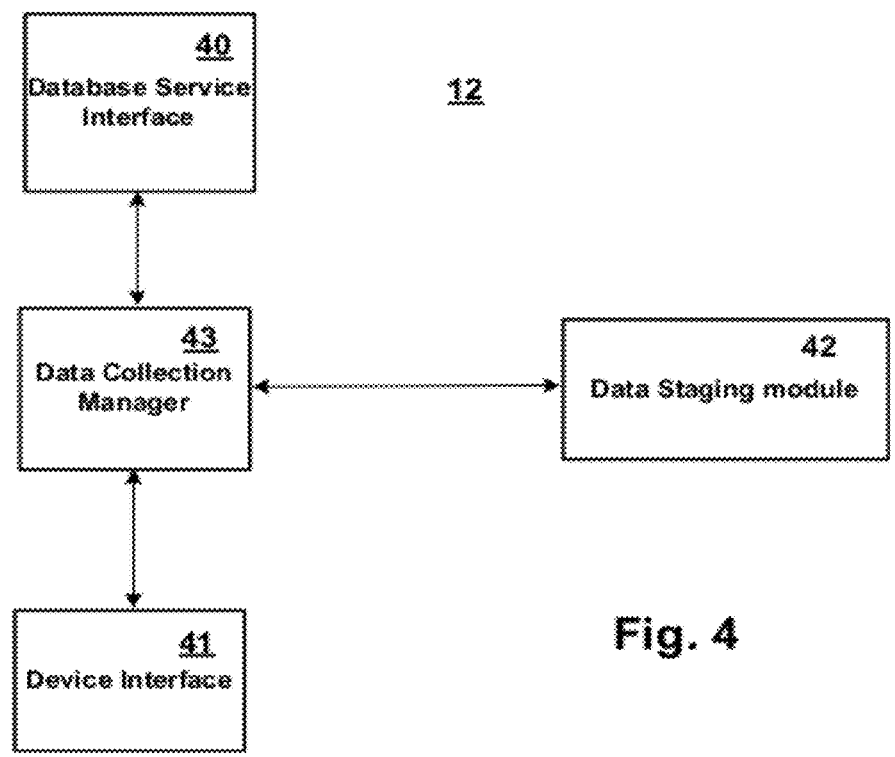
FIG. 4 is a block diagram of the data collector.

The Data Collector(s) 12, shown in more detail in FIG. 4, is/are responsible for collecting data from the data sources and passing it to the Database Service 10 for storage and further analysis. This component is responsible for understanding the native format of the data being collected and the physical method of collecting that data.

The Data Collector 12, comprising database service interface 40 for interfacing to the database 10, device interface 41 for interfacing to the various devices, data staging module 42 for staging the data prior forwarding to the database service module 10, and the data collection manager 43 for managing collection of the data from the various devices and forwarding to the database service module 10.

The Workstation 13 represents the end user interface. As the user interface the vast majority of the functionality of the Workstation 13 is implementation defined and indeed the invention imposes no structure on the Workstation other then those constraints listed above. The functions that should be implemented in a workstation 13 include allowing the user to view data that is stored by the Database Service, allowing the user to view, modify, create or delete rules that are used by the Analysis Engine, and allowing the user to run rules against data stored by the Database Service. Whether the results of these rules being processed generate alarms or not is implementation specific though there is an advantage to having the results not be reported. In this manner the user can "test" new rules against live data.

The Workstation should incorporate additional maintenance characteristics. While these characteristics are not part of the solution from a deployment point of view it is advantageous to have a centralized tool for all maintenance operations The Workstation should also make use of user login and access levels for the execution of all functions. This is to ensure that while the Workstation can be used to perform functions such as modifying the central set of rules this capability should only be extended to certain users.

Finally, the Workstation should support the ability to collect data directly from a target and relay that data to the Database Service as if it had arrived from a Data Collector. The reason for this is to ensure that data can be collected and analyzed in the event that a Data Collector can no longer automatically collect data from a target.

Figure 5:
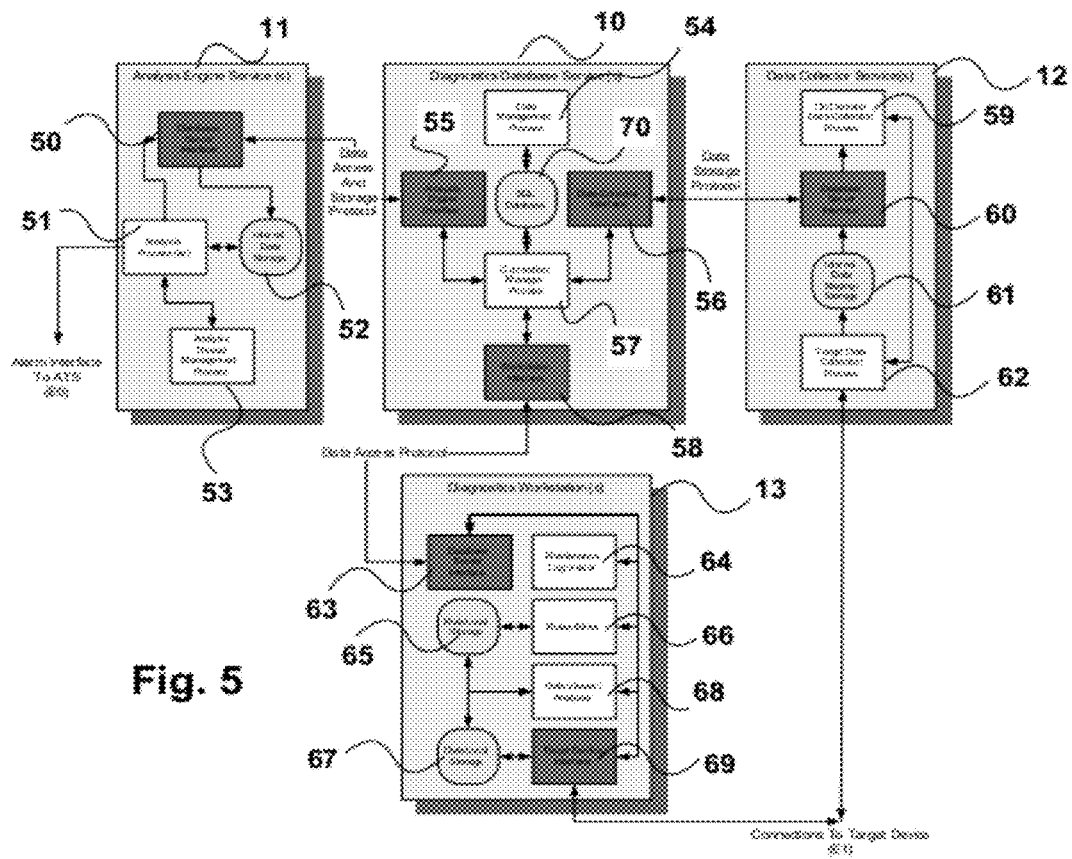
FIG. 5 is a block diagram of the system at a lower level of abtraction.

A more detailed view of the software components is shown in FIG. 5. The Data Collection Services 12 are used to retrieve data from the devices being monitored, format the data, and store the data in the Diagnostics Database Service. There can be any number of Data Collector Services present and each Data Collector Service may collect data from any number of devices. Each Data Collector Service will be installed on a Diagnostics Server though multiple Data Collectors can be installed on the same Diagnostics Server.

These Data Collector Services 12 will take the form of an operating system service running with the permissions thereof. Each Data Collector Service will implement and support the following components: Target Data Collection Process 62, Database Server Interface 60, and an On-Demand Data Collection Process 59.

The Data Collection Process is responsible for receiving data from the device(s) being monitored and placing that data in local storage specific to the Data Collector Service. It is the responsibility of this component to know how to communicate with the target device(s) and retrieve diagnostic information from it/them. For example, the Data Collection Process for the may take the form of an SNMP server and receive diagnostic information from routers and Access Points (AP)s using the SNMP protocol.

Depending on the device type being monitored, the Data Collection Process may require the use of a Remote Data Collection/Concatenation Device (DCCD). This device is essentially a small subsystem that is used to collect diagnostic information remotely and then transmit it to the Data Collection Process. An example where this would be necessary is in collecting information from a VOBC (Very intelligent Onboard controller) used in driverless trains. A VOBC has numerous components which can generate diagnostic information but cannot transmit it. In this case a DCCD would reside with the VOBC and would use the Diagnostic Protocol to collected information from various sources and would then concatenate and compress this data before transmitting it to the Data Collection Process. A DCCD will also maintain a local back up of the data being transmitted on removable storage so that if there is a communication failure the data can be retrieved manually. For this reason, each Data Collector Service that utilizes a DCCD will also have a mechanism for retrieving data from removable storage and processing it as if it had been retrieved directly from the DCCD. Even though the DCCD may be a separate physical device, from an architecture point of view it is considered a part of the Data Collection Process of the Data Collector Service.

The Database Server Interface is responsible for retrieving data from the Data Collector Service's internal storage and formatting it for transmission to the Diagnostics Database Service. 10 This process is required to transform the raw data received by the Data Collection Process into the standardized format required by the Diagnostics Database Service. This methodology allows for a clear separation between processed data and raw diagnostic data and hence does not place any constraints on the diagnostic information received from monitored devices.

The Internal Data Staging/Storage 52 acts as an intermediary between the Data Collection Process and the Database Service Interface fulfills two roles. First, it allows the Data Collection Process to retrieve data unhindered by how long it takes to format and store that data and secondly it allows for physical storage of received raw data to exist. This second point is important as it allows for the storage and archiving of raw diagnostic information. This is useful in the case where, for arguments sake, only 85% of retrieve diagnostic data is actually stored in the database (for example, some data is considered extraneous or has no analytical value). By having this data backed up, if in future that additional 15% of data becomes worthwhile it will have still been collected and no historical data will have been lost.

The On-Demand Data Collection Process 59 is responsible for out-of-band interrogation of target devices. The Data Collection Process, while constantly retrieving data, will do so on some sort of schedule (for example, if there are 20 VOBCs from which data needs to be collected it is not unconceivable to see that some sort of round-robin polling will be used or network bandwidth limitations may impose a bit rate cap and hence collection rate limitation). The On-Demand Data Collection Process is used when immediate diagnostic data is required. If the Analysis Engine Service (described later) determines, in the course of its fault detection, that immediate diagnostic data is required it can call upon the On-Demand Data Collection Process of the relevant Data Collector Service (via the Diagnostics Database Service) to immediately collected data from a specified target device for processing. This data will be captured through the standard mechanisms of the Data Collector Service as described above but the On-Demand Data Collection Process will ensure that the request data is collected continuously regardless of the standard schedule used by the Data Collection Process until such time as the On-Demand Data Collection process receives a notification from the Diagnostics Database Service that the on-demand collection is no longer required.

The Diagnostics Database Service 10 is responsible for storing, managing, and protecting all collected diagnostic data. A deployment can have any number of Diagnostics Database Services present and each of them will be capable of running independent of each other.

The Diagnostics Database Service will take the form of an operating system service running with the permissions thereof. The Diagnostics Database Service contains the following software components: the Workstation Interface 58, the Data Collector Interface 56, the Analysis Engine Interface 55, The Connection Manager Process 57 and the Data Management Process 54.

The Data Management Process 54 is responsible for maintaining the data in the SQL Database so that it is easily analyzed and efficiently stored. This process runs on a configurable schedule and is responsible for the archiving of old data. Data stored in the SQL Database 70 by the Data Collector Interface (and to a lesser extent the Workstation Interface) is maintained for a configurable sliding window. Data found in the SQL Database that lies outside the window is dumped to a file and purged from the database. The concept is that data only has diagnostic value for a set amount of time after which it is too old to provide any immediate value. The Data Management Process is also responsible reinserting dumped data back into the SQL Database. This functionality is present to allow the reinsertion of historical data so that it may be reanalyzed if needed. Since the data being reinserted will by default lie outside of the configurable sliding window this data will most likely be purged again at the next running of the Data Management Process.

The Connection Manager Process 57 is responsible for supervising the operation of the various interfaces provided by the Diagnostics Database Service. This component is responsible for detecting and eliminating duplicate connections and for ensuring that one connection does not compromise or interfere with the operation of another connection. This component is also responsible for handling requests received by any of the interfaces that has an impact on another interface. For example, if the Analysis Engine Interface 11 receives a request for on-demand data collection from an Analysis Engine Service then it is the Connection Manager Process 57 that is responsible for determining which Data Collector Interface, if any, to route that request to.

The Data Collector Interface is responsible for maintaining communication between the Diagnostics Database Service and any number of Data Collector Services. This component exists to provide a level of separation between the Data Collector Services and the actual physical data storage (the SQL Database). This component is responsible for validating all requests for storage made by a Data Collector Service to ensure that only data that that Data Collector Service is responsible for is being stored. This is done to ensure that multiple Data Collector Services do not unintentionally corrupt each others data. This interface is also responsible for validating any requests by Data Collector Services to define new device types, device instances, or data types. This interface also handles notifications to the Data Collector Services whenever the Analysis Engine Interface receives a request for on-demand data collection.

The Analysis Engine Interface 55 is responsible for maintaining communication between the Diagnostics Database Service and any number of Analysis Engine Service. This component exists to provide a level of separation between the Analysis Engine Services and the actual physical data storage (the SQL Database). This component is responsible for validating all requests for rules and data made by an Analysis Engine and then servicing those requests as appropriate. Additionally, this interface is responsible for receiving on-demand data collection notifications and passing them on to the Connection Manager Process for disposition as well as for receiving notification of faults so that they can be logged in the SQL Database.

The Workstation Interface 58 is responsible for maintaining communication between the Diagnostics Database Service and any number of Diagnostics Workstations. This component exists to ensure that data held by the Diagnostics Database Service is not accidentally comprised by the Diagnostics Workstations. This component will fulfill requests sent to it by Diagnostics Workstations in the course of their running. These requests consist of:

Retrieving a data set from the Diagnostics Database Service for analysis or viewing on the workstation.

Uploading of the rule to the local storage of the Diagnostics Workstation (synchronization of the Workstation's rules with the rules strong by the Diagnostics Database Service).

Downloading of a new rule from the Diagnostics Workstation to the Diagnostics Database Service.

Uploading of new maintenance records for storage and archiving on the Diagnostics Database Service.

Retrieval of archived maintenance records for viewing.

Uploading of data collected directly by the Diagnostics Workstation to the Diagnostics Database Server.

The requests dealing with the rules exist to allow one "core" set of rules to exist on the Diagnostics Database Service while allowing each Diagnostics Workstation to have its own set of rules (which can be re-synchronized with the main rules). In this manner the integrity of the on-line data analysis performed by the Analysis Engine Services is maintained while allowing a maintainer using a Diagnostics Workstation to create and test new rules off-line. If a new rule is found to have analytical value this rule can then be sent to the Diagnostics Database Service for inclusion in the main rules and on-line data analysis and other Diagnostics Workstations can then pick up that rule by performing synchronization. Every time a new rule is uploaded to the Diagnostics Database Service a backup copy is made of the existing rules and the modification is recorded in the SQL Database.

The Analysis Engine Service 11 is used to analyze data stored by the Diagnostics Database Service to detect faults or potential faults and notify the users of the system of such. The Diagnostic System can support any number of Analysis Engine Services installed on any number of Diagnostics Servers.

The Analysis Engine Service has three components: the Database Server Interface 50, the Analysis Process(es) 51, and the Analysis Thread Management Process 53.

The Database Server Interface 50 is responsible for establishing and maintaining communication with a Diagnostics Database Server. This component is responsible for handling all data requests from the other components of the Analysis Engine Service and formatting and transmitting those requests to the Diagnostics Database Server. Similarly, this component is responsible for routing replies for the Diagnostics Database Server back to the component that initiated the request. The Database Server Interface is responsible for providing these functions while abstracting out the fact that these requests are being made to another device; to the other components of the Analysis Engine Service it would appear as if the data requests were being handled locally.

The Analysis Thread Management Process 53 is responsible for the operation and synchronization of the Analysis Process(es). This component is responsible for initiating and maintaining all Analysis Processes that are currently running within the Analysis Engine Service. This component, when creating an Analysis Process, will provide that process with the queue of rules and data sets that it is to operate on. It is the responsibility of the Analysis Thread Management Process to ensure that the entire queue of rules and data sets are analyzed in a timely manner and ensure that there are sufficient Analysis Processes and systems resources to make this happen.

The Analysis Process 53 is responsible for actual analysis of the data against the rules. This component will request data and rule from the Database Server Interface as required in order to fulfill the mission given to it by the Analysis Thread Management Process. The Analysis Process 53 has autonomous control over how it executes the mission however. If the Analysis Process detect that a threshold condition has been reached or if on-demand data collection is required, it is free to modify it's mission and/or requests on-demand data collection as necessary. If the Analysis Process detects that a fault has occurred then the Analysis Process is responsible for triggering an alarm to the ATS and for logging the alarm through the Database Server Interface.

The Diagnostics Workstations 13 are used to view and analyze data collected in the Diagnostics Database Services for maintenance and academic purposes. The Diagnostic System can support any number of Diagnostics Workstation instances though there will ever only be one Diagnostics Workstation installed on any one physical PC. The Diagnostics Workstation may also be installed on Diagnostics Servers in addition to any other software that is installed on those PCs.

These Diagnostics Workstations have five components: the Database Server Interface 63, the Maintenance Log Viewer 64, the Rules Editor 66, the Data Viewer/Analyzer 68, and the Target Device Interface 69.

The Database Server Interface 63 is responsible for establishing and maintaining communication with a Diagnostics Database Server. This component is responsible for handling all data requests or uploads from the other components of the Diagnostics Workstation and formatting and transmitting those requests to the Diagnostics Database Server. Similarly, this component is responsible for routing replies for the Diagnostics Database Server back to the component that initiated the request. The Database Server Interface is responsible for providing these functions while abstracting out the fact that these requests are being made to another device; to the other components of the Diagnostics Workstation it will appear as if the data requests were being handled locally.

The Maintenance Log Viewer component 64 is used to allow a user to create and update maintenance records for storage on the Diagnostics Database Service. Maintenance records are stored on the Diagnostics Database Service and are associated with a device. The Maintenance Log Viewer can also be used to retrieve historical maintenance records from the Diagnostics Database Service for a particular device for viewing.

The Rules Editor component 66 of the Diagnostics Workstation allows a user to synchronize the rule local storage of the Workstation with the central rule repository stored by the Diagnostics Database Service. The Diagnostics Workstation has two distinct sets of rules: those that exist only ever locally and the local, user modifiable, copies of the centrally stored rules. A synchronize operation merges only the local copy of the centrally stored rules such when the operation is completed the local copy of the centrally stored rules will match those stored on the Diagnostics Database Service. This component can also be used to view and modify rules stored locally on the Diagnostics Workstation including the local copy of the rules received from the central storage. The component can also be used to create new rules either in the local only rule storage 65 or in the local copy of the central rules.

The Data Viewer/Analyzer component 68 is used to view data stored by the Diagnostics Database Service or data has that has been dumped to a file by the Diagnostics Database Service. Data may be analyzed with the application of rules from the rule local storage though any alarm or error conditions detected in this manner are not transmitted to the ATS. This is done to allow the user to test new rules without triggering erroneous or spurious alarms. The data on the Diagnostics Database Service may also be simply viewed as trending graphs to allow the user to view data trends graphically. This function is designed to allow the user to plot preventative maintenance strategies by analyzing what components of the system are used more or less frequently. An example would be determining which switches move more often and targeting maintenance at those switch machines over less used switch machines. This component also allows the user to view any alarms that have been stored on the Diagnostics Database Service by an Analysis Engine Service. From these alarm notifications the user can view the specific data set that triggered the alarm.

The Target Device Interface 69 is responsible for collecting data from a device in the event that the Data Collector Service is unable to retrieve data from that device. This component is designed using a plug-in architecture to allow for the collection of data from different device types. The plug-in would be developed as part of the Data Collector Service for a specific device type since the plug would have to do much of the same conversion functions that the Data Collector Service itself does. This component will collect data from a connected and format that data for transmission to the Diagnostics Database Service just as if the data had come from a Data Collector Service directly. In cases where the Data Collector Service employs a DCCD it is possible that the Target Device Interface may connect to the DCCD instead of directly to the device.

Figure 6:
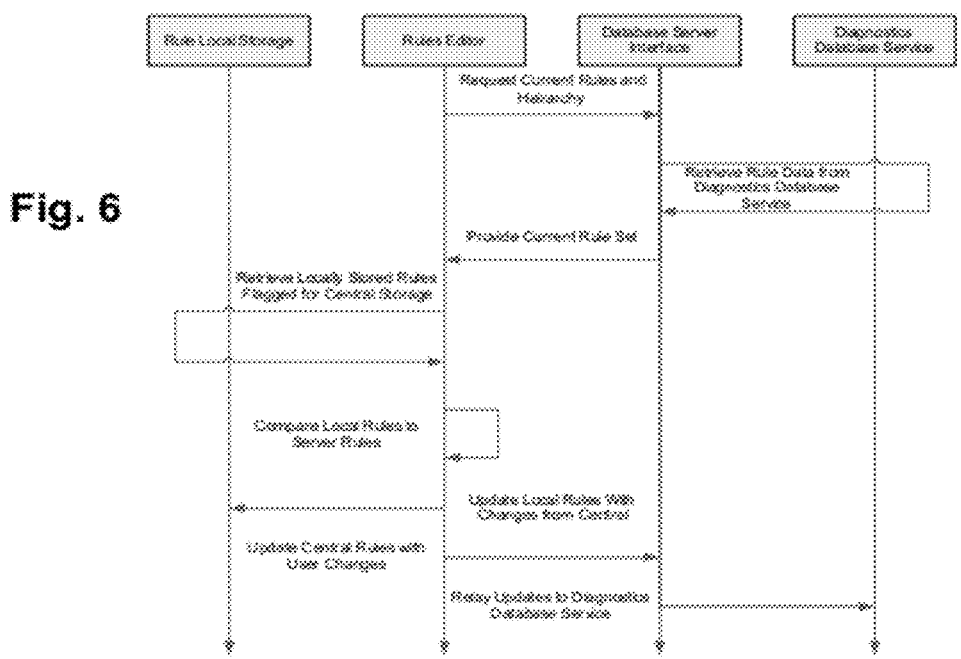
FIG. 6 is a diagram illustrating the rules synchronization.

The Rules Editor 66 provides two core features, the synchronization of rules in the Diagnostics Workstation's rules local storage with the primary rules storage on the Diagnostics Database Service and the off-line creation and modification of local rules. FIG. 6 illustrates the sequence of events that takes place during a rule synchronization event. Upon user notification or schedule, the Rules Editor will request a list of all rules and their hierarchy from the Diagnostics Database Service via the Database Server Interface. The Rules Editor will then retrieve the local copy of the centrally stored rules and their hierarchy. The Rules Editor will then analyze both sets of rules to determine, on a rule by rule basis, which set of rules is more recent. The changes from each set are then merged and then both the local copy and central copy of the rules are updated. This is an important distinction. The central rules do not necessarily overwrite the local set of rule and neither does the local set of rules overwrite the central rules. A merge operation is performed to ensure that the most recent changes from either location are preserved. Whenever a clash between the central and local copies of the rules is detected, the central rules will overrule the local copy of the rules.

The Data Viewer/Analyzer 68 provides two functions, graphical representation of data stored on the Diagnostics Database Service and off-line analysis of that same data. Data local storage 67 is provided to store local data in the diagnostic workstations 13.

Figure 7:
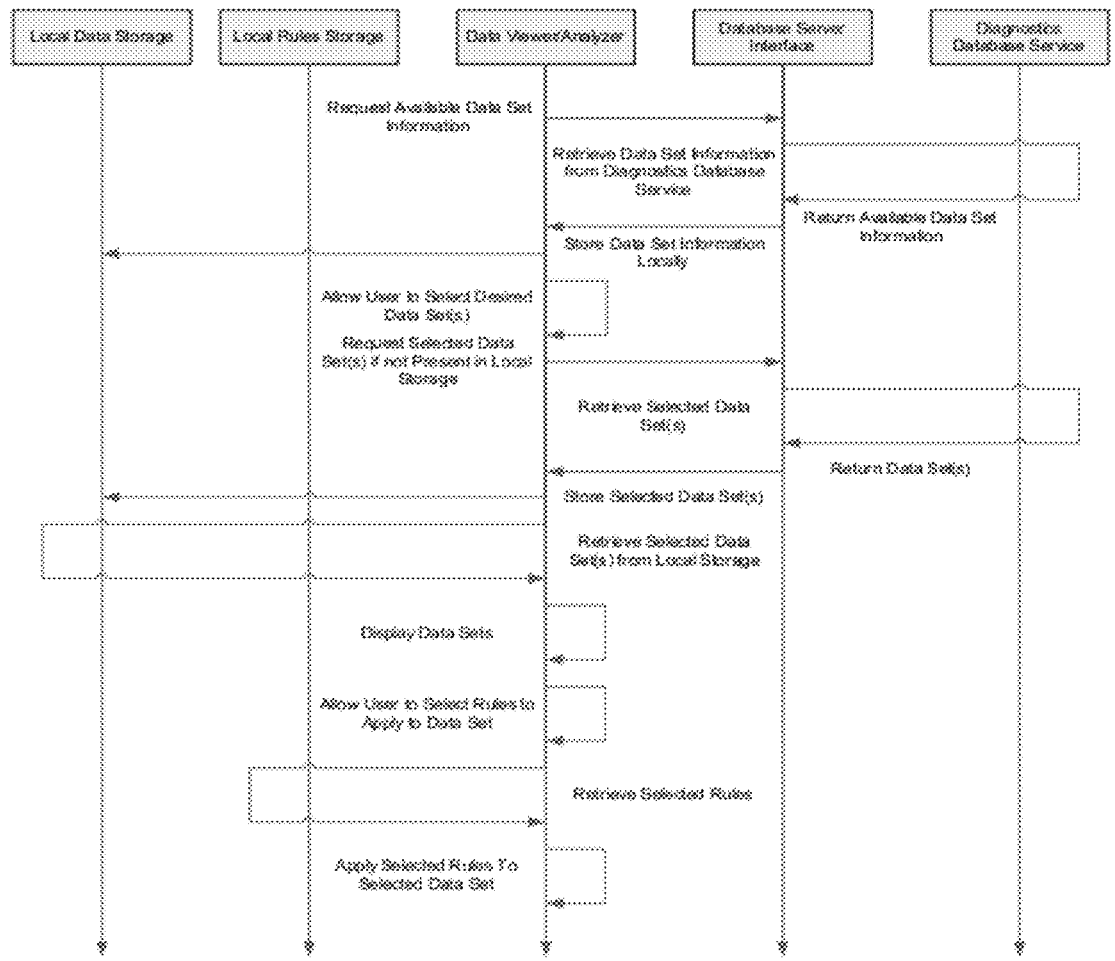
FIG. 7 is a diagram illustrating the data/viewer/analyzer logic.

FIG. 7 illustrates the sequence of events that take place in the use of the Data Viewer/Analyzer. Upon user selection or based on a schedule, the Data Viewer/Analyzer will query the Diagnostics Database Service via the Database Server Interface to retrieve a list of the data sets available. When this information is returned the Data Viewer/Analyzer will store the available data set in it's local data storage. The user may then select a list of data sets to view based on the information stored in the local data storage. Once the user has made a selection the requested data sets will be retrieve from the Diagnostics Database Service via the Database Server Interface. Once the selected data has been retrieved this data will also be stored in the local data storage. The logic behind this design decision is that data manipulation is quicker using local resources and by having this data present if the user in future wishes to view it the data does not need to be transferred from the Diagnostics Database Server again.

Once the user selected data has been inserted in to the local data storage, the Data Viewer/Analyzer will retrieve that data and display it either as a list of data or a graph based on user selection. The Data Viewer/Analyze also allows a user to select one or more rules to run against the data set. The list of rules presented to the user is based on the rules that currently exist in the local rules storage. Once the user has selected a set of rules those rules will be run against the selected data set and the results of that analysis will be presented to the user.

Figure 8:
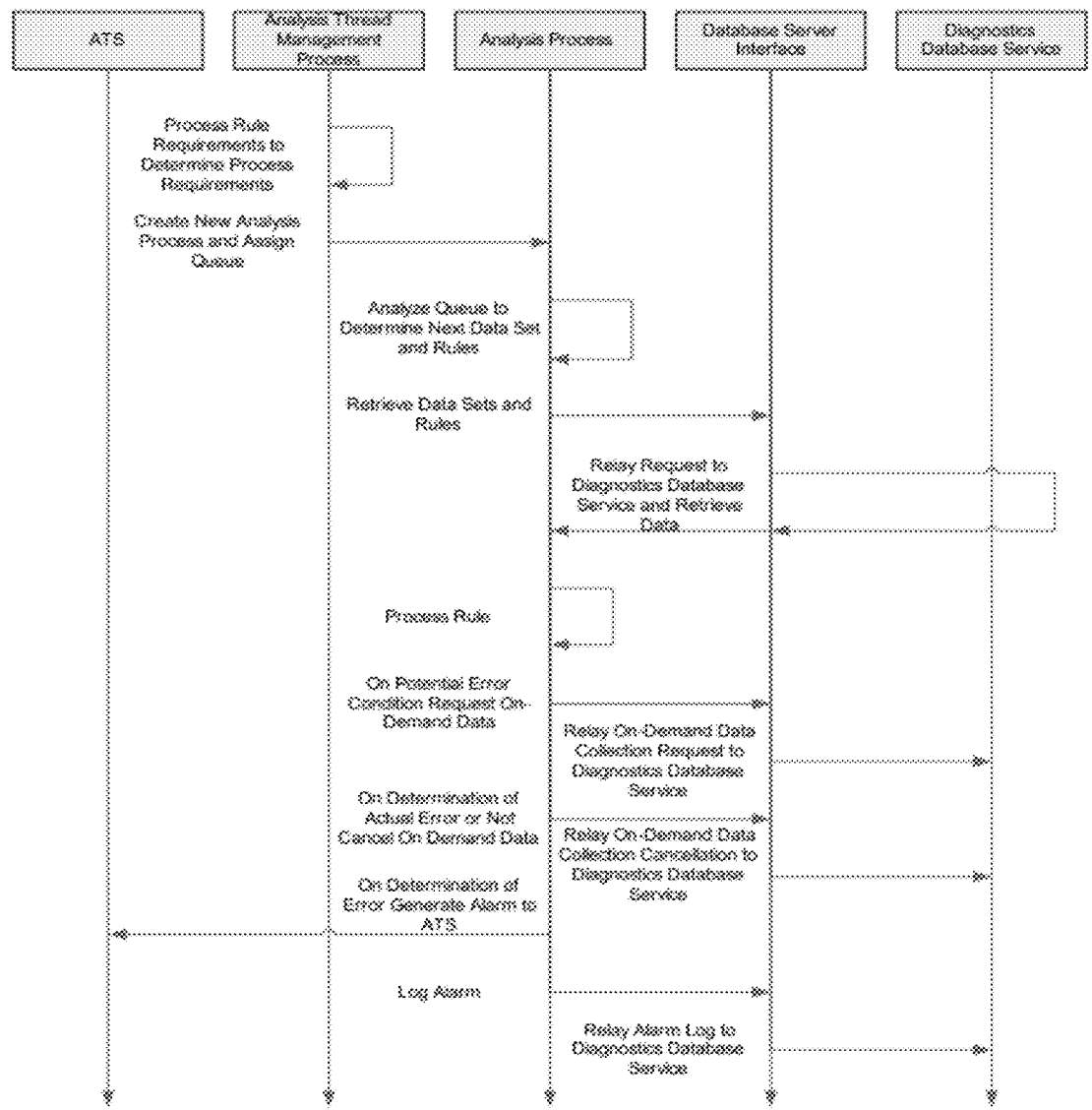
FIG. 8 is a diagram illustrating the data analysis process.

The Analysis Engine Service is responsible for online analysis of store diagnostic information for the purpose of detecting failures and reporting those failures. The Analysis Thread Management Process, shown in FIG. 8, will constantly iterate through its configured queues of rule processing allotments and ensure that all queues are assigned to an Analysis Process and being executed. If a rule queue is not assigned to an active process the Analysis Thread Management Process will instantiate a new Analysis Process and assign that queue to it.

The newly created Analysis Process will then analyze the queue it has been given and determine what rules and data sets are required to process the next rule in the queue. It will then notify the Database Server Interface to retrieve the relevant data. Once the data has been return to the Analysis Process it will execute the rules to determine if the data passes the rule or not. At this point the Analysis Process has many branches it can follow. If the data passes the rule then the Analysis Process will simply determine the next rule to run and will repeat the last actions taken for this next rule. If the data set fails to pass then rule then one of three things can occur. If the rule specifies that a failure will trigger processing of child rules then the Analysis Process will simply start executing the child rule path. If the rule triggers on-demand data collection then the Analysis Process will generate a request for such to the Database Server Interface. The Database Server Interface will then relay this request to the Diagnostics Database Service. The Analysis Process will then constantly re-analyze this rule using any newly available data until such time as either the rule passes or the rule fails in such a way as to trigger a different reaction. If the rule specifies that a failure must result in an alarm then the Analysis Process will generate an alarm to the ATS as well as log the alarm and all its particulars in the Diagnostics Database Service via the Database Server Interface.

The Analysis Process will constantly execute it's queue of rules until either the Analysis Thread Management Process instructs it to terminate or until the queue assigned to it specifies that it should terminate.

Figure 9:
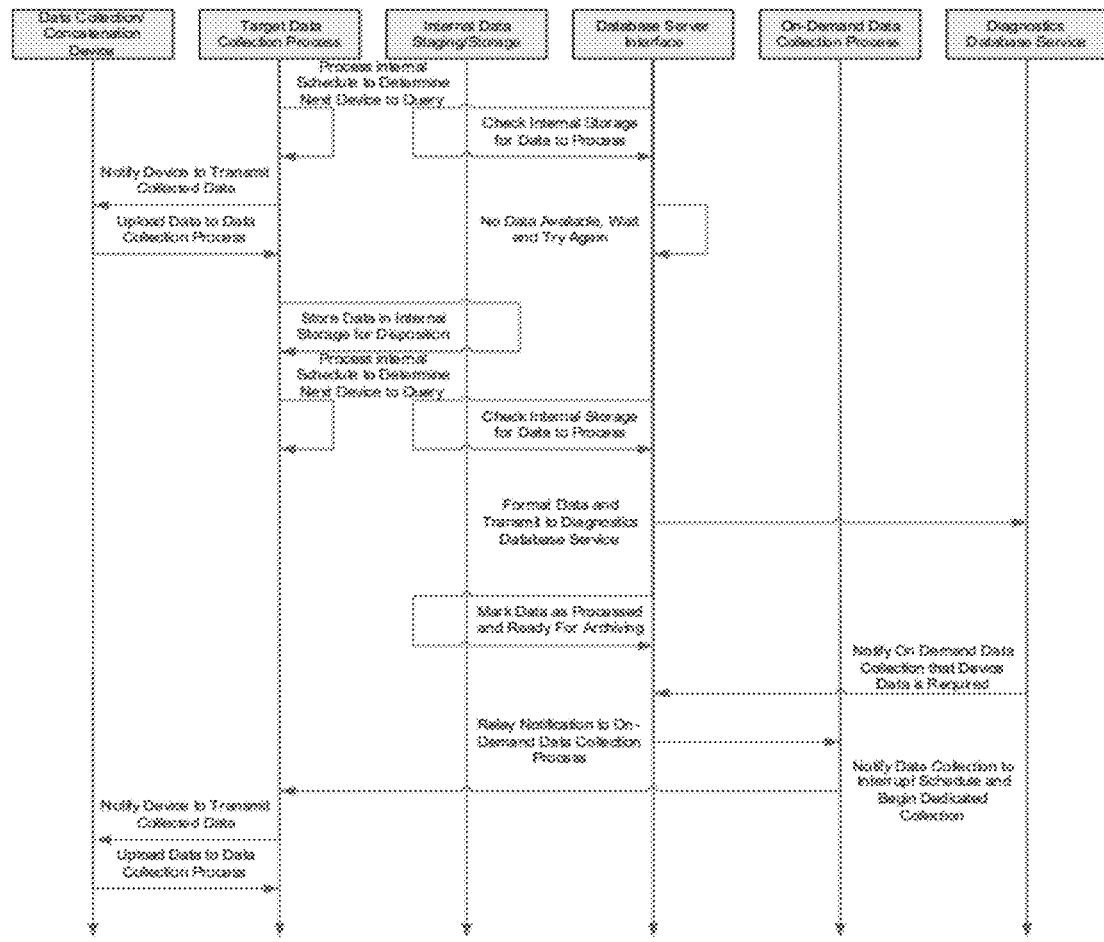
FIG. 9 is a diagram illustrating the data collection services.

The Data Collector Services are used to retrieve data from monitored devices and store that data in the Diagnostics Database Service. This interface description assumes that the Data Collector Service displayed uses a Data Collection/Concatenation Device though the sequence of events would be similar in an instance where no such remote data collection is necessary. The Target Data Collection Process and Database Service Interface, shown in FIG. 9, each run their own internal schedule independent of external influence. The Database Server Interface will periodically check the internal data staging/storage to see if any data is available for formatting. If data is found the Database Service Interface will process the data and format it for transmission to the Diagnostics Database Service. Once a data set has been transmitted the Database Service Interface will flag the source data as processed hence marking it for archiving.

The Target Data Collection Process runs an internal schedule used to retrieve data from monitored devices. This schedule is specific to each implementation of the Data Collector Service. At some point the Target Data Collection Process will determine it is time to query a specific device for diagnostic information. At that point the Target Data Collection Process will retrieve diagnostic information from the monitored device. In the diagram above this is done through a Data Collection/Concatenation Device. The end result is that the Target Data Collection Process retrieves diagnostic data which it then stores in the internal data staging/storage to be picked up by the Database Service Interface.

The Diagnostics Database Server, in the course of it's own internal processing may relay an on-demand data collection notification to the Data Collector Service via the Database Service Interface. When this occurs the Database Service Interface will relay that notification to the On Demand Data Collection Process. The On Demand Data Collection process will then notify the Target Data Collection Process to suspend it's internal schedule and commence retrieving diagnostic data from the device specified. This continues until such time as the Database Service Interface receives a notification from the Diagnostics Database Service to terminate on-demand data collection.

It should be appreciated by those skilled in the art that any block diagrams herein represent conceptual views of illustrative circuitry embodying the principles of the invention. The invention may be implemented on a processor, which may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The invention claimed is:

1. A data analysis apparatus for analyzing data from multiple devices forming part of an infrastructure, comprising:
a database service module including a data storage subsystem storing data collected from disparate devices in a generalized data structure that allows the data collected from all devices to be treated in a common manner, wherein meaning from the data is stripped such that the data is reduced to just a number, and wherein the data from the disparate devices is stored as homogenized data regardless of the form or source of the original data in a database defined by a meta-structure that uses primitives to classify the homogenized data, said primitives comprising device type, device instance, and data type, wherein device type determines the type of device that is the source of the data, device instance identifies the particular device within a device type that is the source of the data, and data type indicates the nature of the stored data;
an analysis engine configured to analyze the data to determine whether the data defined by the meta-structure meets certain criteria in accordance with a stored set of rules; and
a workstation configured to permit the user to view and analyze the homogenized data in a common manner without regard to the source thereof, wherein the meta-structure separates and categorizes the data such that all data is handled identically and such that the data analysis apparatus is prevented from knowing what data was collected.

2. A data analysis apparatus as claimed in claim 1, wherein the device type comprises the status of the device constituting the source of the data.

3. A data analysis apparatus as claimed in claim 1, wherein the rules are stored in a database forming part of the database service module.

4. A data analysis apparatus as claimed in claim 1, wherein the database service module further comprises a data collector interface and a data management processing module for receiving data from multiple devices via the data collector and storing the data in the data storage subsystem in accordance with said meta-structure.

5. A data analysis apparatus as claimed in claim 4, further comprising a data collection service module comprising a data collection manager for managing collection of data from the multiple devices through a device interface and communicating with the database service module through a database service interface.

6. A data analysis apparatus as claimed in claim 5, wherein the data collection service module includes a data staging module for temporarily staging data prior to forwarding to the database service module.

7. A data analysis apparatus as claimed in claim 1, wherein the data storage subsystem is Structured Query Language (SQL) database.

8. A data analysis apparatus as claimed in claim 1, wherein the analysis engine includes an analysis engine manager for determining which rules are run, in what order, against which types of device or device instance, and the frequency at which the rules are processed.

9. A data analysis apparatus as claimed in claim 8, wherein the analysis engine manager further comprises an analysis queue module for processing rules assigned to it by the analysis engine manager.

10. A data analysis apparatus as claimed in claim 9, wherein the analysis queue module is configured to issue an alert notification to the processed data meeting certain criteria.

11. A data analysis apparatus as claimed in claim 10, wherein the analysis queue module is configured to trigger the processing of other rules in response to the processed data meeting certain criteria.

12. A data analysis apparatus as claimed in claim 10, wherein the analysis queue module is configured to trigger on-demand data collection in response to the data processed under a certain rule meeting certain criteria.

13. A data analysis apparatus as claimed in claim 12, wherein the queue analysis module is configured to trigger processing of the on-demand data at a higher frequency than the data processed under said certain rule.

14. A data analysis apparatus as claimed in claim 1, wherein the workstation is configured to permit the user to run specific rules against particular data stored by the database service module.

15. A computer-implemented method of analyzing data from multiple devices forming part of an infrastructure, comprising:
collecting the data from disparate devices on an on-going basis;
storing the collected data in a data storage subsystem of a database service module in a generalized data structure that allows the data collected from all devices to be treated in a common manner, wherein meaning from the data is stripped such that the data is reduced to just a number, and wherein the data from the disparate devices is stored as homogenized data in a cohesive manner regardless of the form or source of the original data in a database defined by a meta-structure that uses primitives to classify the homogenized data, said primitives comprising device type, device instance, and data type, wherein device type determines the type of device that is the source of the data, device instance identifies the particular device within, a device type that is the source of the data, and data type indicates the nature of the stored data;
analyzing the data to determine whether the data defined by the meta-structure meets certain criteria in accordance with a stored set of rules; and
accepting user instructions through a workstation permitting the user to analyze the homogenized data, wherein the meta-structure separates and categorizes the data such that all data is handled identically and such that the data analysis apparatus is prevented from knowing what data was collected.

16. A method as claimed in claim 15, wherein the device type comprises the status of the device constituting the source of the data.

17. A method as claimed in claim 15, further comprising storing the rules in a database forming part of the database service module.

18. A method as claimed in claim 15, wherein the analysis engine determines which rules are run, in what order, against which types of device or device instance, and the frequency at which the rules are processed.

19. A method as claimed in claim 18, wherein the analysis engine module issues an alert notification to the processed data meeting certain criteria.

20. A method as claimed in claim 19, wherein the analysis engine triggers the processing of other rules in response to the processed data meeting certain criteria.

21. A method as claimed in claim 19, wherein the analysis engine triggers on-demand data collection in response to the data processed under a certain rule meeting certain criteria.

22. A method as claimed in claim 21, wherein the analysis engine triggers processing of the on-demand data at a higher frequency than the data processed under said certain rule.

23. A method as claimed in claim 15, wherein the collected data is temporarily staging data prior to forwarding to the database service module.

24. A method as claimed in claim 15, further comprising supplying the data stored in the database service module for viewing by a user.

25. A method as claimed in claim 15, further comprising configuring rules to be used by the analysis engine through a user interface.

26. A method as claimed in claim 25, further comprising commanding the running of specific rules against particular data stored by the database service module through a user interface.

27. A non-transitory computer readable medium storing instructions for analyzing data from multiple devices forming part of an infrastructure, said instructions when implemented on a computer providing:
a data collector for collecting data from different devices on an on-going basis;
a database service module for storing the data in a generalized data structure that allows the data collected from all devices to be treated in a common manner, wherein meaning from the data is stripped such that the data is reduced to just a number, the data from the disparate devices being stored as homogenized data in a cohesive manner regardless of the form or source of the original data in a database defined by a meta-structure using primitives to classify the data, said primitives comprising device type, device instance, and data type, wherein device type determines the type of device that is the source of the data, device instance identifies the particular device within a device type that is the source of the data, and data type indicates the nature of the stored data;

an analysis engine configured to analyze the data to determine whether the data defined by the meta-structure meets certain criteria in accordance with a stored set of rules; and a workstation interface for interfacing with a workstation to provide a user interface to permit a user to analyze the homogenized data, wherein the meta-structure separates and categorizes the data such that all data is handled identically and such that the data analysis apparatus is prevented from knowing what data was collected.

28. A non-transitory computer readable medium as claimed in claim 27, wherein the workstation is configured to permit the user to create and modify the stored set of rules.

29. A non-transitory computer readable medium as claimed in claim 28, wherein the workstation is configured to permit the user to run particular rules stored in the system.

* * * * *